March 18, 1952 J. R. TAPLINGER 2,589,518
APPARATUS FOR FORMING STRANDLIKE PRODUCTS ON A CARRIER
Filed June 16, 1944 5 Sheets-Sheet 1
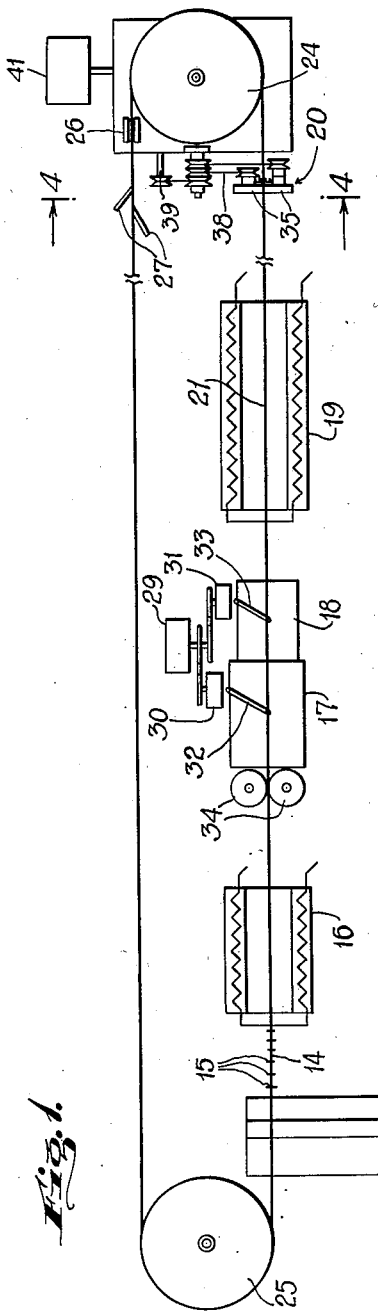
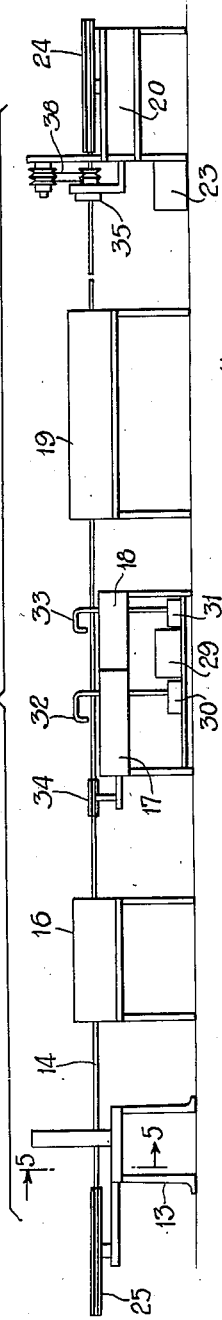
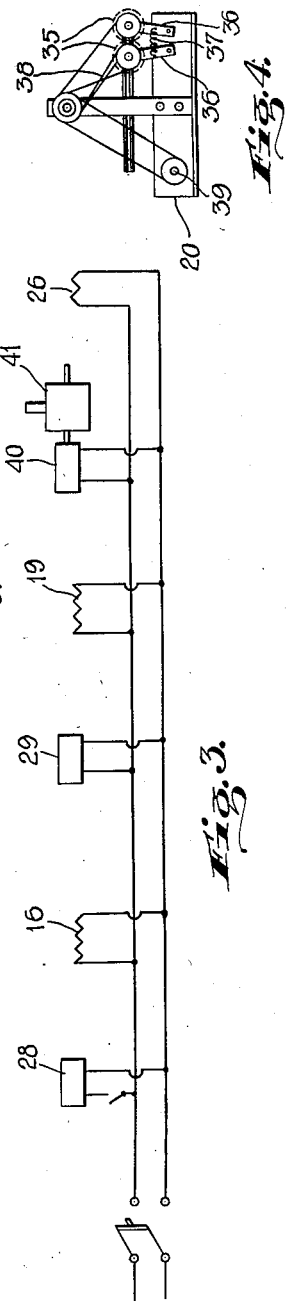
INVENTOR
JEAN R. TAPLINGER
BY
ATTORNEY

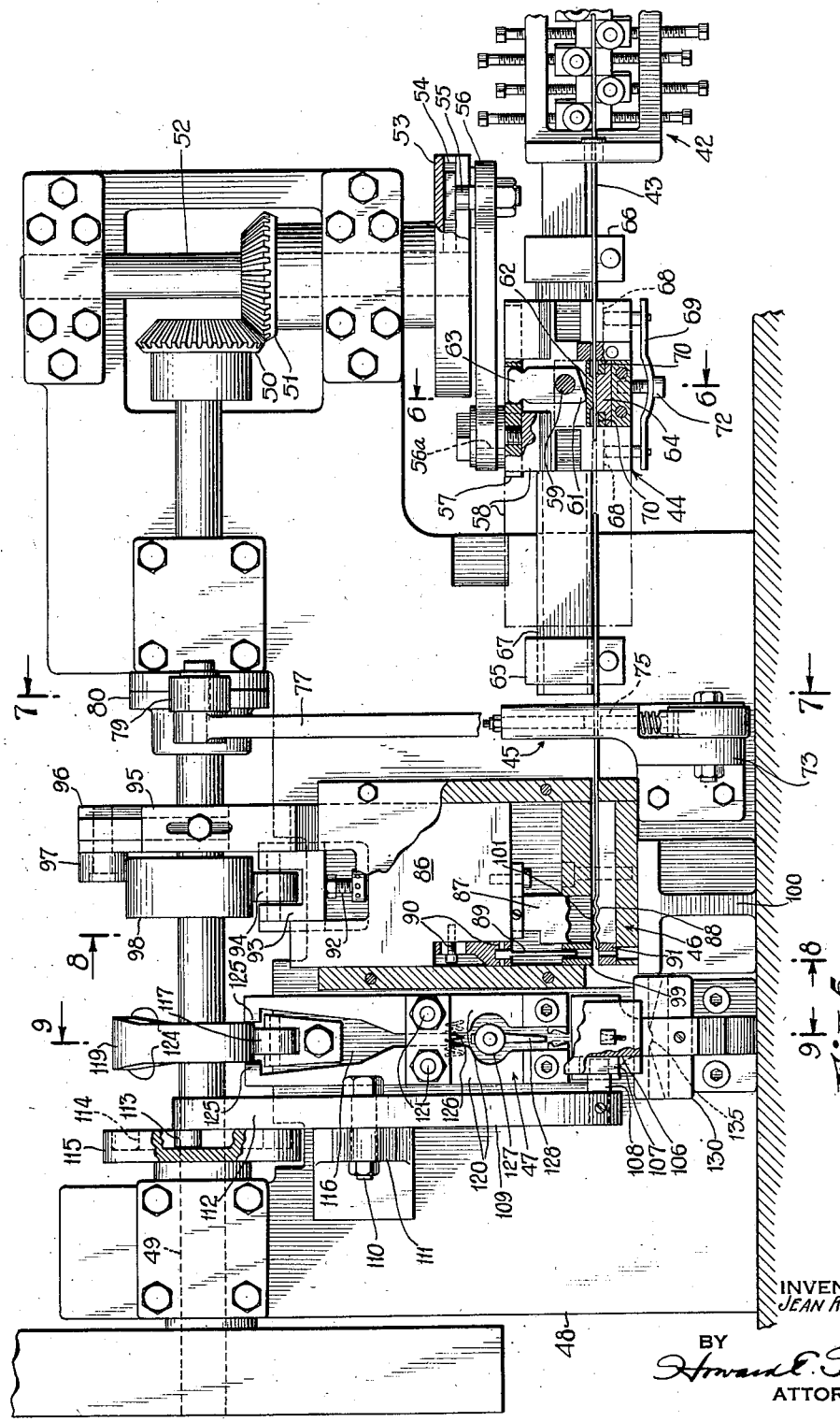

March 18, 1952  J. R. TAPLINGER  2,589,518
APPARATUS FOR FORMING STRANDLIKE PRODUCTS ON A CARRIER Filed June 16, 1944  5 Sheets-Sheet 3

INVENTOR
JEAN R. TAPLINGER
BY
Howard E. Thompson
ATTORNEY

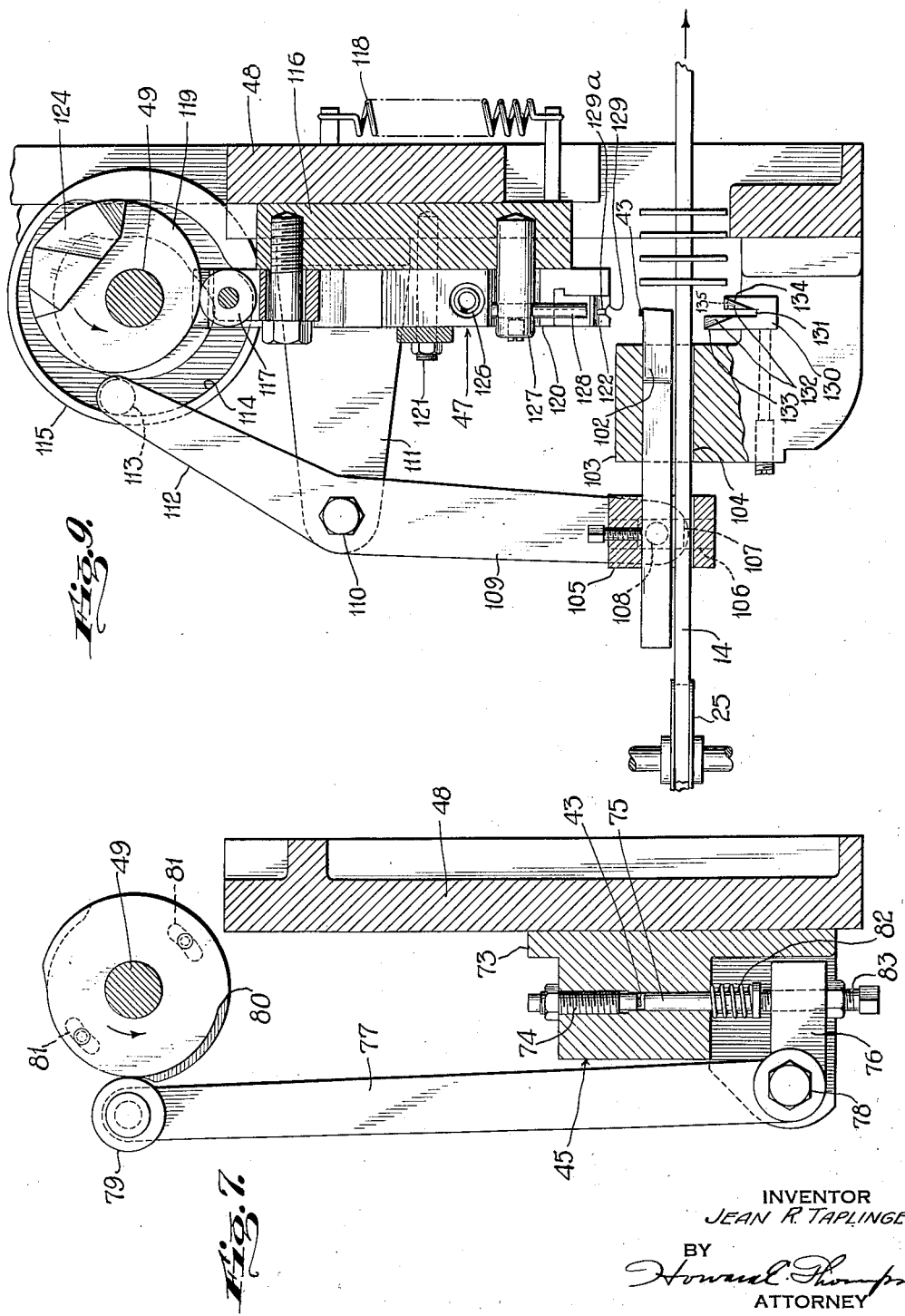

March 18, 1952  J. R. TAPLINGER  2,589,518
APPARATUS FOR FORMING STRANDLIKE PRODUCTS ON A CARRIER
Filed June 16, 1944  5 Sheets-Sheet 5
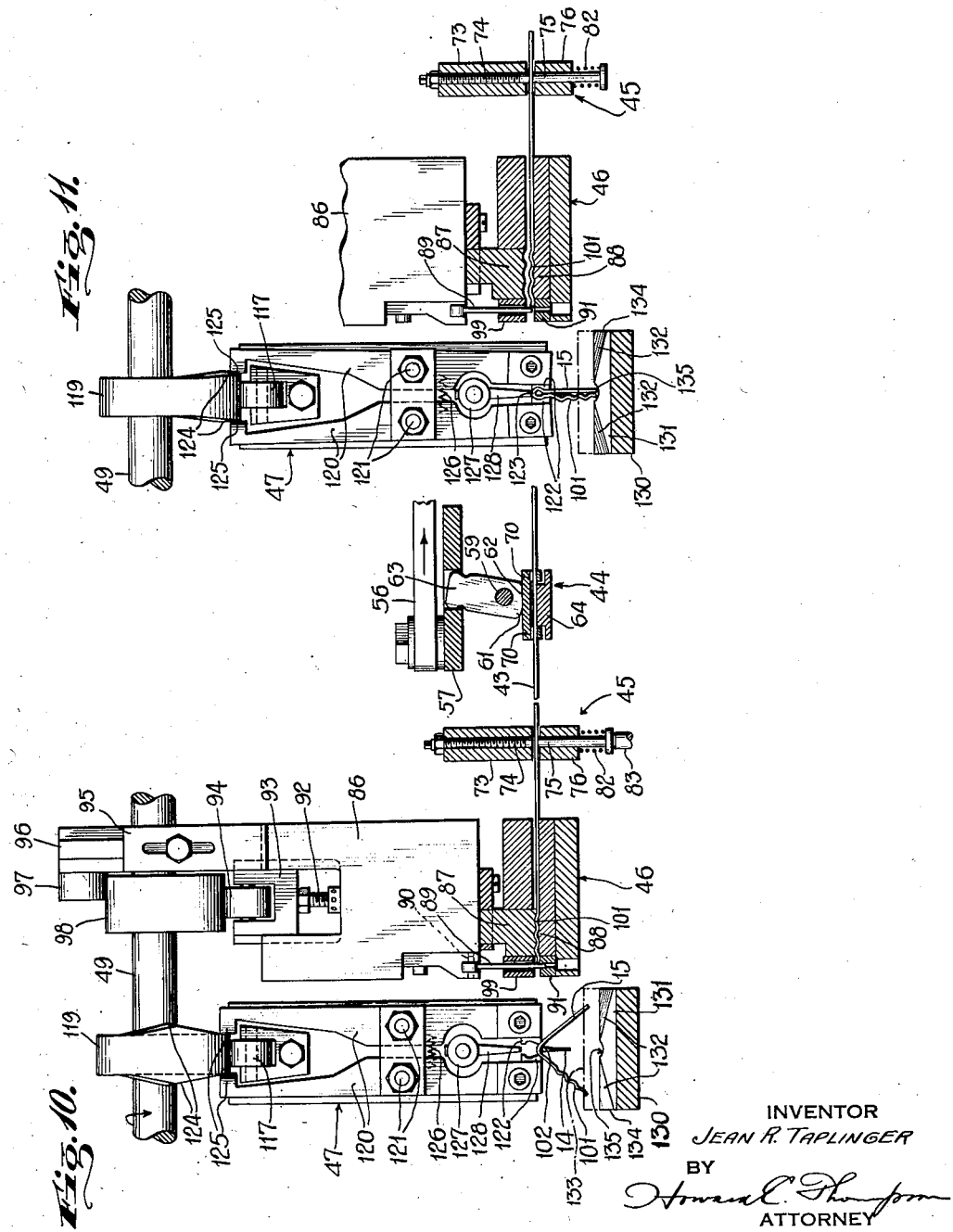
INVENTOR
JEAN R. TAPLINGER
BY
ATTORNEY Patented Mar. 18, 1952

2,589,518

UNITED STATES PATENT OFFICE 2,589,518

APPARATUS FOR FORMING STRANDLIKE PRODUCTS ON A CARRIER

Jean R. Taplinger, Englewood, N. J., assignor to Solo Products Corporation, a corporation of New Jersey Application June 16, 1944, Serial No. 540,732

11 Claims. (Cl. 140—87)

This invention relates to apparatus for shaping an elongated wire or similar strand of any cross sectional contour to shape it into a product or article of manufacture and in shaping and forming the same around a carrier, then in conveying the product through a series of treating or processing stations to coat or otherwise treat and process the product, and then finally to remove the product from the carrier. The novel features of the invention will be best understood from the following description when taken together with the accompanying drawings in which certain embodiments of the invention are disclosed and in which the separate parts are designated by suitable reference characters in each of the views, and in which:

Fig. 1 is a diagrammatic plan view of an apparatus showing the general arrangement of mechanisms in performing the complete cycle of forming and processing strand-like articles, and in the final removal of the articles from an endless carrier employed.

Fig. 2 is a side elevation diagrammatically illustrating the arrangement of the apparatus, as seen in Fig. 1.

Fig. 3 is a view showing the wiring diagram.

Fig. 4 is a sectional view substantially on the line 4—4 of Fig. 1.

Fig. 5 is a sectional view substantially on the line 5—5 of Fig. 2, showing a face view of that part of the apparatus employed for feeding, shaping, trimming and forming the wire into a product, herein referred to as wire-forms, with parts of the construction broken away and in section.

Fig. 7 is a partial section on the line 7—7 of Fig. 5 on an enlarged scale.

Fig. 9 is a section substantially on the line 9—9 of Fig. 5.

Fig. 10 is a view similar to Fig. 5, showing only parts of the construction and diagrammatically illustrating the feeding, forming, trimming and final shaping operations of the machine; and Fig. 11 is a view similar to Fig. 10, showing only part of the construction, with parts in a different position.

Figure 8:
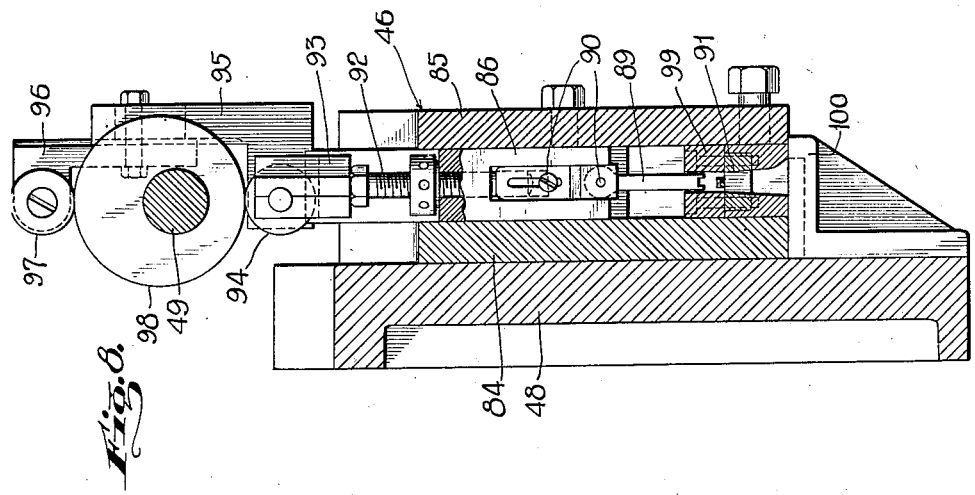
Fig. 8 is a section substantially on the line 8—8 of Fig. 5 on an enlarged scale.

For purposes of illustrating one adaptation and use of the invention, the same will be described in connection with such products or articles of manufacture commonly referred to as wire-forms, produced from wire, of any desired cross sectional form. Still more particularly, the invention deals with the formation of products of this general type and kind in an apparatus having a plurality of stations, whereby in a complete cycle of operation, the finished products are formed, tempered, cleaned, coated, baked and/or set and discharged from the apparatus.

Considering Figs. 1 and 2 of the drawing, 13 will designate the forming station employing the machine for feeding an endless strand of wire, then forming the wire to crimp or corrugate at least a portion thereof, then trim the wire to form workpieces, and then form or shape the workpieces around an anvil or forming tool and directly upon a conveying or carrying member, which is generally indicated by the reference 14, and is a metallic band of any desired cross sectional form. After passing through the machine 13, the band with the wire-forms 15 thereon first pass through a heating station 16, then through a coating station 17, which includes a supplemental blower station 18 for removing surplus coating material, then through another heating station 19, and then through an ejector station 20 which removes the wire-forms from the carrier 14. It is here to be noted that somewhere between the stations 18 and 20, the carrier 14 is twisted, as diagrammatically indicated at 21, so that the closed or looped ends 123 (Fig. 11) of the wire-forms, which are normally directed upwardly as they come from the machine 13, will be directed downwardly so as to be automatically fed into a suitable receiver 23 at the ejector station 20.

The ejector station 20 also comprises the feed station for feeding the conveyor or carrier 14 through the apparatus including a feed wheel 24, the conveyor or carrier also passing around an idler wheel 25 arranged adjacent the station 13. After passing around the feed wheel 24, the carrier 14 passes through another heater 26 to soften any of the coating material which may prevail on the carrier band 14, after which the band passes between scrapers 27 for removing the softened coating material from the band in order that the band may be kept clean in initially passing into the machine 13.

Considering the wiring diagram, which is diagrammatically illustrated in Fig. 3 of the drawing, it will appear that the machine station 13 includes an electric motor 28 for driving the machine, and at 16, 19 and 26 are indicated the various electric heaters, designated by the stations of like reference numerals. The purpose of the heater 16 is to heat, clean, and/or set the wire-forms prior to the application of coating material thereto at the station 17, whereas the heater 19 is somewhat longer than the heater 16, and is employed to dry or bake, as the case may be, the coating materials to set or harden these materials so that the finished products can be discharged at the ejector station 20. At this time, it will be understood that the spacing of the various stations one with respect to the other will be made to suit the particular treatment or coating of the products being made.

At the stations 17 and 18 is arranged an electric motor 29, to which is geared, by suitable gearing diagrammatically shown in Fig. 1, a pump 30 and a blower 31. The pump is used for circulating and discharging a coating through a nozzle 32 directly above a tank over which the nozzle is arranged. At the station 18 is arranged another air nozzle 33 above another tank for discharging surplus coating material from the coated products, as well as the carrier 14. Just in advance of the tank of the station 17, are a pair of freely rotatable rollers 34, which tend to tilt or angularly dispose the wire-forms on the carrier 14, and this facilitates coating and also facilitates movement of the wire-forms into the ejector rollers 35 at the ejector station 20.

The rollers 35 are mounted on two pivoted arms 36 which may be bolted together or urged together by a spring 37, note Fig. 4. The rollers are driven from a belt and pulley construction generally indicated by the reference character 38, and driven from the motor shaft 39 of one electric motor 40 at the station 20. At this station is another reduction speed motor 41 which is employed to drive the wheel 24 to control the feed of the carrier 14 through the entire apparatus. The drive of the ejector rollers 35 is such as to feed the wire-forms downwardly in removing the same from the vertically disposed carrier band 14, and into the receptacle 23 which is positioned beneath the rollers 35 at the station 14, and is diagrammatically indicated in Fig. 2 of the drawing.

The machine of the machine station 13 is illustrated in detail in Figs. 5 to 11 inclusive. Considering Fig. 5 of the drawing, the general arrangement of the various mechanisms of this machine will be noted. At the extreme right of Fig. 5 is shown at 42, part of the straightening mechanism for straightening a wire 43 from a source of supply before it enters the feed mechanism, generally indicated by the reference 44. At 45 is indicated a gripper mechanism for gripping the wire to hold it stationary in the backward movement of the feed mechanism or in movement thereof to the right, as seen in Fig. 5. At 46 is generally shown the forming and trimming mechanism of the machine, and at 47 is generally indicated the mechanism for forming the wire into the finished product and around the conveyor or carrier 14, this latter mechanism being most clearly illustrated in Figs. 10 and 11 of the drawing. The straightening mechanism 42 is of more or less conventional type and needs no specific description in this case.

At 48 is shown the general frame work of the machine, which comprises a more or less vertical plate like member in the upper portion of which is supported in suitable bearings a drive shaft 49, at one end of which is a bevelled gear 50 which meshes with a corresponding gear 51 on a vertical shaft 52. Supported on the lower end portion of the shaft 52 is a drive wheel or disc 53 having a radial slot 54 for adjustable coupling of one pin end 55 of a connecting rod 56 therewith. The other end of this rod is coupled, as seen at 56-A with a slide 57 of a workpiece feed block 58. Pivoted in the block 58, as seen at 59, is a gripper actuating finger 60, the lower cammed end 61 of which is adapted to engage a wire gripper 62, which is of channel cross sectional form, as seen in Fig. 5 of the drawing. The upper end of the finger 60 has a rounded head 63, which operates in an elongated slot in the slide 57, it will thus be seen that in the movement of the block 58 to the left, initial movement of the crank 56 will first operate the finger to wedge the cam end 61 thereof upon the gripper 62 to force the wire 43 into firm engagement with a fixed gripper plate 64, and then the block and mechanism constituting part thereof will move with the wire to feed the required length thereof for forming the desired product. This feed is adjustable by regulating the position of the coupling pin 55 in the wheel 53. At 65 and 66 are shown stops adjustably supported on the guide rail 67 of the sliding block 58 to provide safety checks for the sliding movement of the block 58, and these checks or stops are preferably located beyond the point of travel of the block 58 in either direction.

In order to maintain a balanced movement of the block 58 along the rail 67, gibs 68 are supported by an adjustable flat spring 69 to maintain yieldable contact with said rail.

As above stated, the gripper 62 is of channel cross sectional form, as seen in Fig. 5, and the depending flanges which extend downwardly over the ends of the stationary gripper 64 have apertures 70 through which the wire 43 is free to pass, particularly on movement of the feed block 58 to the right.

Figure 6:
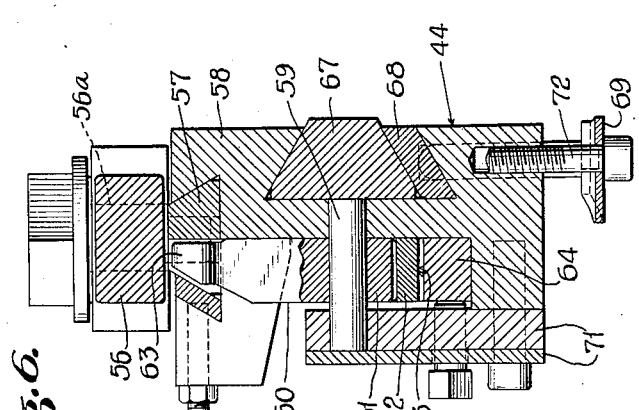
Fig. 6 is a partial section on the line 6—6 of Fig. 5 on an enlarged scale.

Considering Fig. 6 of the drawing, the block 58 includes front plates 71, one of which forms the support for the pivot 59, and these plates also serve to house the various parts 61, 62 and 64 in the block. At 72 is shown the screw for adjusting the tension of the spring 69.

The wire gripper mechanism 45 comprises a bracket 73 arranged upon the plate 48, and adjustably supported in the bracket is a backing screw 74, against which the wire 43 can be gripped by the plunger 75, movable in the direction of the screw 74, the plunger being actuated by the short end 76 of a lever 77 pivoted to an extension of the bracket, as indicated at 78. The upper end of the lever carries a roller 79 which operates upon a cam 80, secured to the shaft 49. The cam 80 comprises relatively adjustable discs, adjustable through the medium of circumferentially elongated slots 81, considering Fig. 7, in order to regulate the positioning of the high portion of the cam in controlling the intermittent gripping of the wire to hold the same stationary in the backward feed of the block 58, or in movement thereof from left to right, as seen in Fig. 5. Arranged on the plunger 75 is a spring 82, which urges the plunger against an adjustable screw 83 supported in the short arm 76, and this spring maintains the roller 79 in constant engagement with the cam 80.

Supported upon the frame plate 48 are two slide guide plates 84 and 85, note Fig. 8 of the drawing, in which is vertically slidable a die and cutter operating block 86, carrying at the lower portion one part 87 of the crimping or corrugating die, the other stationary part being shown at 88. The block also carries at its lower end the punch cut-off tool 89 which has a pivotal and adjustable mounting, as generally indicated by the reference 90. Below the punch 89 is arranged the cutter die block 91. In other words, both the die 87 and the punch 89 move collectively with the block 86, and an adjustable screw 92 is coupled with the upper end of the block and couples a yoke 93 therewith, and in the yoke is arranged a roller 94. Supported on the block 86 is an upwardly extending bracket portion 95 with which is adjustably coupled an L-shaped frame 96, carrying another roller 97. Both rollers 94 and 97 operatively engage a cam 98 on the shaft 49, and this cam provides positive movement of the forming die and punch toward and from the wire to crimp and trim the wire. The dies 88 and 91 are arranged in a block 99 secured to the lower portion of the plates 84 and 85, and also rest upon a lower bracket 100.

The unit 47 is shown in Figs. 5 and 9, and also in Figs. 10 and 11. The wire 43, after being shaped in the unit 46 in the manner indicated at 101, is fed into the final bending and forming unit 47 directly above a forming pin or anvil 102. The end of this forming pin engaged by a wire workpiece is substantially triangular in cross section, as seen in Fig. 10, with the pointed or contracted end directed downwardly, and arranged beneath this end is the carrier or band 14.

The forming pin 102 is supported in a bracket 103, note Fig. 9, and below the pin the bracket has an opening 104 for the free passage of the band 14 therethrough. Secured to the end of the pin protruding from the bracket 103 is a block 105, having a vertical key-way 106 at one side in which is mounted a slide 107 to which is pivoted, as seen at 108, one end 109 of a lever, pivoted as seen at 110 to a bracket 111, the other end 112 of the lever carrying a roller 113 operating in a groove 114 and a cam 115 arranged upon the shaft 49. The cam 115 operates to reciprocate the pin or anvil 102 back and forth, so as to bring this pin beneath the workpiece to support the central part thereof in the initial bending operation, as indicated in Fig. 10, and then to be withdrawn in the final bending or forming operation, as seen in Fig. 11.

Mounted to move vertically on the frame 48, is a slide 116, carrying at its upper end a roller 117 held by a spring 118 in constant engagement with a cam 119, arranged upon the shaft 49. The face of the cam serves to move the slide 116 in the downward feed of two similar tong-like die members 120 in the direction of the wire workpiece to engage the workpiece in bending or folding the same around the pin or anvil 102, as partially seen in Fig. 10 of the drawing. The die members are pivoted to the slide, as seen at 121, and have at their lower ends die elements 122 adapted to shape the central eye portion 123 of the finished wire-form. In the aforesaid downward movement of the dies 120, the elements 122 are moved toward each other by the cam surfaces 124 at opposite sides of the cam 119, engaging the ends 125 of the tong dies 120, the completion of this operation being seen in Fig. 11 of the drawing.

A spring 126 is arranged between adjacent surfaces of the dies 120, which serves to maintain the ends 125 of the dies in constant engagement with side surfaces of the cam 119. Also adjustably supported, as seen at 127, on the slide 116, is a backing pin 128, which is adapted to engage the loop 123 of the wire-form in the operation of moving the die elements 122 toward each other. This backing pin 128 maintains the workpiece against displacement, particularly upon withdrawal of the anvil 102. The elements 122 are relatively small, and secured to the lower ends of the die tongs 120, as seen in Fig. 9 of the drawing, and their lower surfaces are bevelled and grooved, as shown at 129-A, to positively locate the workpiece 43.

Arranged in the bracket 103, directly beneath the die elements 122, is a combination guide and stripper block 130, having a channel 131 longitudinally thereof to receive the ends of the workpiece in the bending operation shown in Figs. 10 and 11, the block having bevelled surfaces 132 at opposite sides of the slot 131 to properly aline the ends of the wire-form in the final formation thereof and the raised wall portion 133 of the block serves to strip the wire-form from the forming pin or anvil 102 when the latter is retracted. The other shorter wall 134 of the block 130 has a recess 135 centrally thereof to clear the ends of the wire-form arranged upon the band or carrier 14 in the feed of the band out through the machine, in the manner clearly illustrated in Fig. 9 of the drawing.

It will be apparent that while the feed of the band or carrier 14 is at slow speed and constant, the actual engagement of the finished wire-form with the band takes place at the moment of completing the final bending operation, as indicated in Fig. 11 of the drawing, and immediately upon completion of this operation, the tong dies 120 are separated, thus allowing the wire-form to move freely to the right, as seen in Fig. 9, and successive operations will result in a spacing of the wire-form substantially as indicated in Fig. 9. However, different spacing may be provided by changing the speed of the carrier 14, and may also be varied in forming different types and kinds of products according to the general method herein defined.

It will be apparent that the instant a workpiece has been trimmed by the shearing tool 89 from the wire 43, the next successive workpiece has been automatically formed to put the crimpings or corrugations 101 therein. It will thus be apparent that immediately upon completion of the formation of one wire-form on the carrier 14, the next workpiece will be advanced and the cycle of operation of bending and forming the workpiece to produce the resulting pin as above described will be repeated. As the wire-forms are formed on the carrier 14, they are conveyed through the first heater 16 and then passed through the rollers 34, then into the coating or treating unit 17, then through the blower 18 or other unit for removing surplus coating, then through the drying or baking unit 19, and then finally discharged into the receptacle 23 by the ejector rollers 35.

In treating different types and kinds of workpieces and in using different types and kinds of coating or treating materials, the stages as diagrammatically illustrated in Figs. 1 and 2 of the drawing may be modified and varied to suit the particular product being produced. In other words, in some instances, the pre-heating as by the unit 16, can be dispensed with, and in other instances, the unit 19 for drying and baking can be disposed of or modified to suit the coating materials employed.

More generally stated, it may be said that the complete process carried out by the apparatus comprises the steps of first feeding an elongated workpiece into a shaping and forming machine and automatically applying the workpiece to a conveyor or carrier used to eject and feed the product from the machine and also in utilizing said conveyor or carrier to move the workpiece with respect to one or more stations for further processing the product, and finally to move the product to an ejector station employed to automatically remove the products from the conveyor or carrier.

Having fully described my invention, what I claim as new and desire to secure by Letters Patent is:

1. In an apparatus for automatically forming and treating strand like products of the class described, said apparatus employing an automatically fed endless carrier, a machine for forming a strand like product and automatically applying the same to said carrier, said machine having means for intermittently feeding an elongated strand into predetermined position adjacent a part of the carrier passed through the machine, means for severing workpiece lengths from said strand, means for forming the workpiece around said carrier and frictionally attaching the same to the carrier to facilitate removal therefrom, said last named means comprising a pair of dies for shaping part of the workpiece, including a forming pin arranged between adjacent surfaces of the dies, means for retracting the forming pin in the final formation of the workpiece by said dies, means for shaping the strand preparatory to feeding the same in position to form, by said severing operation, the resulting workpiece, and means adjacent the dies cooperating with the ends of the workpiece for alining said ends one with respect to the other in forming the workpiece on said carrier.

2. In machines of the class described, means for feeding a carrier member through the machine, means for shaping a workpiece on the carrier member in providing a plurality of products from successive workpieces spaced longitudinally of the fed carrier, said shaping means comprising an anvil around which the workpiece is bent, a pair of dies, means for moving the dies relatively to the anvil in partially shaping the workpiece thereon, means for withdrawing the anvil, means for simultaneously moving the dies toward each other in completing the shaping of the workpiece, and other means engaging the workpiece to guide and support the same in the final shaping thereof upon said carrier.

3. In machines of the class described, means for feeding a carrier member through the machine, means for shaping a workpiece on the carrier member in providing a plurality of products from successive workpieces spaced longitudinally of the fed carrier, said shaping means comprising an anvil around which the workpiece is bent, a pair of dies, means for moving the dies relatively to the anvil in partially shaping the workpiece thereon, means for withdrawing the anvil, means for simultaneously moving the dies toward each other in completing the shaping of the workpiece, other means engaging the workpiece to guide and support the same in the final shaping thereof upon said carrier, and said last named means comprising a backing member engaging the workpiece at the folded portion thereof.

4. In machines of the class described, means for feeding a carrier member through the machine, means for shaping a workpiece on the carrier member in providing a plurality of products from successive workpieces spaced longitudinally of the fed carrier, said shaping means comprising an anvil around which the workpiece is bent, a pair of dies, means for moving the dies relatively to the anvil in partially shaping the workpiece thereon, means for withdrawing the anvil, means for simultaneously moving the dies toward each other in completing the shaping of the workpiece, other means engaging the workpiece to guide and support the same in the final shaping thereof upon said carrier, said last named means comprising a backing member engaging the workpiece at the folded portion thereof, and means engaging the ends of the workpiece to aline said ends one with respect to the other.

5. In machines of the class described, means for feeding a carrier member through the machine, means for shaping a workpiece on the carrier member in providing a plurality of products from successive workpieces spaced longitudinally of the fed carrier, said shaping means comprising an anvil around which the workpiece is bent, a pair of dies, means for moving the dies relatively to the anvil in partially shaping the workpiece thereon, means for withdrawing the anvil, means for simultaneously moving the dies toward each other in completing the shaping of the workpiece, other means engaging the workpiece to guide and support the same in the final shaping thereof upon said carrier, said last named means comprising a backing member engaging the workpiece at the folded portion thereof, means engaging the ends of the workpiece to aline said ends one with respect to the other, and a pair of dies for shaping part of the workpiece in advance of forming and applying the workpiece to said carrier.

6. In a machine of the class described, means for feeding an endless carrier through the machine, means for intermittently feeding a strand of wire into the machine in forming successive workpiece lengths, means for severing the wire to form a workpiece disposed adjacent said carrier, means comprising a plurality of forming tools to form the workpiece around and apply the same for frictional engagement with the carrier to provide in successive operations of the machine and feed of the carrier a plurality of products spaced longitudinally of the carrier and discharged from said machine, part of said forming tools comprising a pair of tong-like dies movable with respect to the carrier in two directions, another of said forming tools comprising an anvil supporting the workpiece in one movement of the tong-like dies with respect to said carrier, and still another forming tool to engage the ends of the workpiece for alining said ends one with respect to the other.

7. In apparatus of the class described, a wire shaping and applicator machine comprising means for intermittently feeding predetermined lengths of straightened wire through the machine, means intermittently gripping the wire in one operation of said feeding means, a combined shearing and forming die mounted on a slide, means for positively moving the slide to move said dies toward and from the wire, one of said dies giving predetermined contour to each workpiece length of the wire fed through the machine, means comprising an anvil and a pair of tong-like dies for forming a looped portion in a workpiece severed from the wire by said shearing die, and other means adjacent the last named dies for supporting and guiding the workpiece in the final formation of the product from said workpiece.

8. In apparatus of the class described, a wire shaping and applicator machine comprising means for intermittently feeding predetermined lengths of straightened wire through the machine, means intermittently gripping the wire in one operation of said feeding means, a combined shearing and forming die mounted on a slide, means for positively moving the slide to move said dies toward and from the wire, one of said dies giving predetermined contour to each workpiece length of the wire fed through the machine, means comprising an anvil and a pair of tong-like dies for forming a looped portion in a workpiece severed from the wire by said shearing die, means for guiding a carrier member into predetermined position between said last named dies, and means for moving said dies toward the carrier member and anvil in two different directions.

9. In apparatus of the class described, a wire shaping and applicator machine comprising means for intermittently feeding predetermined lengths of straightened wire through the machine, means intermittently gripping the wire in one operation of said feeding means, a combined shearing and forming die mounted on a slide, means for positively moving the slide to move said dies toward and from the wire, one of said dies giving predetermined contour to each workpiece length of the wire fed through the machine, means comprising an anvil and a pair of tong-like dies for forming a looped portion in a workpiece severed from the wire by said shearing die, means for guiding a carrier member into predetermined position between said last named dies, means for moving said dies toward the carrier member and anvil in two different directions, and means for moving the anvil out of the path of movement of said last named dies in the movement of said dies toward each other.

10. In apparatus for automatically forming and treating strand-like products of the character described, said apparatus employing an automatically fed endless carrier, a machine for forming a strand-like product and automatically applying the same to said carrier, means for guiding the carrier through said machine, said machine having means for intermittently feeding an elongated strand into a forming station of the machine adjacent a part of the carrier guided through the machine, means for severing workpiece lengths from said strand, said forming station comprising a pair of dies and a forming pin arranged between adjacent surfaces of the dies, said dies being adapted to shape part of the workpiece and form the same around said carrier and pin in frictionally attaching the workpiece to said carrier to facilitate removal therefrom, and means for retracting the forming pin in the final formation of the product by said dies and in removal of the product from said station by feed of said carrier.

11. In apparatus for automatically forming and treating strand-like products of the character described, said apparatus employing an automatically fed endless carrier, a machine for forming a strand-like product and automatically applying the same to said carrier, means for guiding the carrier through said machine, said machine having means for intermittently feeding an elongated strand into a forming station of the machine adjacent a part of the carrier guided through the machine, means for severing workpiece lengths from said strand, said forming station comprising a pair of dies and a forming pin arranged between adjacent surfaces of the dies, said dies being adapted to shape part of the workpiece and form the same around said carrier and pin in frictionally attaching the workpiece to said carrier to facilitate removal therefrom, means for retracting the forming pin in the final formation of the product by said dies and in removal of the product from said station by feed of said carrier, each cycle of operation of said machine forming and applying a product to the endless carrier at spaced intervals, and means spaced with respect to said machine for removing the products from the carrier.

JEAN R. TAPLINGER.

REFERENCES CITED

The following references are of record in the file of this patent:

UNITED STATES PATENTS

| Number | Name | Date |
| --- | --- | --- |
| 296,339 | Matteson | Apr. 8, 1884 |
| 396,930 | Hanson | Jan. 29, 1889 |
| 495,626 | Curtis | Apr. 18, 1893 |
| 1,301,559 | Hermsdorf | Apr. 22, 1919 |
| 1,309,660 | Smith | July 15, 1919 |
| 1,321,322 | Myers | Nov. 11, 1919 |
| 1,378,626 | Smith | May 17, 1921 |
| 1,424,473 | Goldberg | Aug. 1, 1922 |
| 1,469,737 | Tevander | Oct. 2, 1923 |
| 1,574,882 | Goldberg | Mar. 2, 1926 |
| 1,691,516 | Glore | Nov. 13, 1928 |
| 1,709,938 | Goldberg et al. | Apr. 23, 1929 |
| 1,988,822 | Weissenborn | Jan. 22, 1935 |
| 2,203,068 | Thiemer | June 4, 1940 |
| 2,207,413 | Quick et al. | July 9, 1940 |